United States Patent
Pai

(10) Patent No.: US 9,318,143 B2
(45) Date of Patent: Apr. 19, 2016

(54) MOTION DETECTION ENABLED POWER OPTIMIZED DISPLAY

(75) Inventor: Mukund Pai, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 154 days.

(21) Appl. No.: 13/997,211

(22) PCT Filed: Nov. 30, 2011

(86) PCT No.: PCT/US2011/062599
§ 371 (c)(1),
(2), (4) Date: Jun. 22, 2013

(87) PCT Pub. No.: WO2013/081598
PCT Pub. Date: Jun. 6, 2013

(65) Prior Publication Data
US 2014/0341533 A1 Nov. 20, 2014

(51) Int. Cl.
H04N 5/775 (2006.01)
G11B 15/18 (2006.01)
H04N 21/4415 (2011.01)
H04N 21/4223 (2011.01)
H04N 21/442 (2011.01)
H04N 21/443 (2011.01)
G06F 1/32 (2006.01)

(52) U.S. Cl.
CPC .............. G11B 15/18 (2013.01); G06F 1/3231 (2013.01); H04N 21/4223 (2013.01); H04N 21/4415 (2013.01); H04N 21/4436 (2013.01); H04N 21/44218 (2013.01); Y02B 60/1289 (2013.01)

(58) Field of Classification Search
None
See application file for complete search history.

(56) References Cited

U.S. PATENT DOCUMENTS

| 2004/0104806 A1* | 6/2004 | Yui et al. ..................... 340/5.74 |
| 2005/0183110 A1 | 8/2005 | Anderson |
| 2007/0198738 A1* | 8/2007 | Angiolillo et al. ............ 709/231 |
| 2008/0123211 A1* | 5/2008 | Chng et al. ..................... 360/55 |
| 2009/0195704 A1* | 8/2009 | Bombara ..................... 348/734 |

(Continued)

FOREIGN PATENT DOCUMENTS

| TW | I272474 | 2/2007 |
| TW | I292865 | 1/2008 |

OTHER PUBLICATIONS

Office Action received for Taiwanese Patent Application No. 101143232, received Sep. 17, 2014, 13 pages including 6 pages English translation.

(Continued)

Primary Examiner — Eileen Adams
(74) Attorney, Agent, or Firm — Kacvinsky Daisak Bluni PLLC

(57) ABSTRACT

Various embodiments are directed to a motion sensor in communication with a processing component capable of controlling a television display and a video recording device. The motion sensor may provide motion detection information to the processing component. The processing component may issue control directives capable of manipulating the television. For instance, based on the absence of motion in a viewing area, the processing component may re-direct content to be recorded while also inactivating the television display to conserve energy. Upon receiving information that motion has been detected in the viewing area, the processing component may issue control directives to activate the television display and resume playing the content that was previously being watched. This may all be done without requiring an action on the part of a user.

26 Claims, 8 Drawing Sheets

(56) References Cited

U.S. PATENT DOCUMENTS

| | | | |
|---|---|---|---|
| 2010/0027963 A1* | 2/2010 | Shiitani et al. | 386/68 |
| 2010/0220972 A1 | 9/2010 | Bryan | |
| 2010/0289644 A1* | 11/2010 | Slavin et al. | 340/568.1 |
| 2011/0057796 A1 | 3/2011 | Candelore | |
| 2011/0134251 A1 | 6/2011 | Kim et al. | |
| 2012/0114194 A1* | 5/2012 | Kim et al. | 382/115 |

OTHER PUBLICATIONS

International Search Report and Written Opinion mailed May 17, 2012 for corresponding PCT/US2011/062599 filed Nov. 30, 2011 (nine (9) pages).

* cited by examiner

600

700

MOTION DETECTION ENABLED POWER OPTIMIZED DISPLAY

BACKGROUND

Many home entertainment systems comprise multiple media sources and output devices that are loosely integrated at best. Media source devices are generally capable of storing and forwarding audio/video content. Output devices are generally capable of displaying video and playing audio in a form understood by a human user. The user is often faced with a scenario that requires her to manipulate multiple remote control devices each associated with a different media source device or output device. In one scenario, the user may unexpectedly need to leave the viewing area for a television. If the program or content being watched is of interest to the user, he would have to remain in the viewing area and operate one or more remote control devices to ensure that the content will be stored. In addition, the user will have to manually power down the television screen. Accordingly, there may be a need for improved techniques to solve these and other problems.

DETAILED DESCRIPTION

Figure 1:
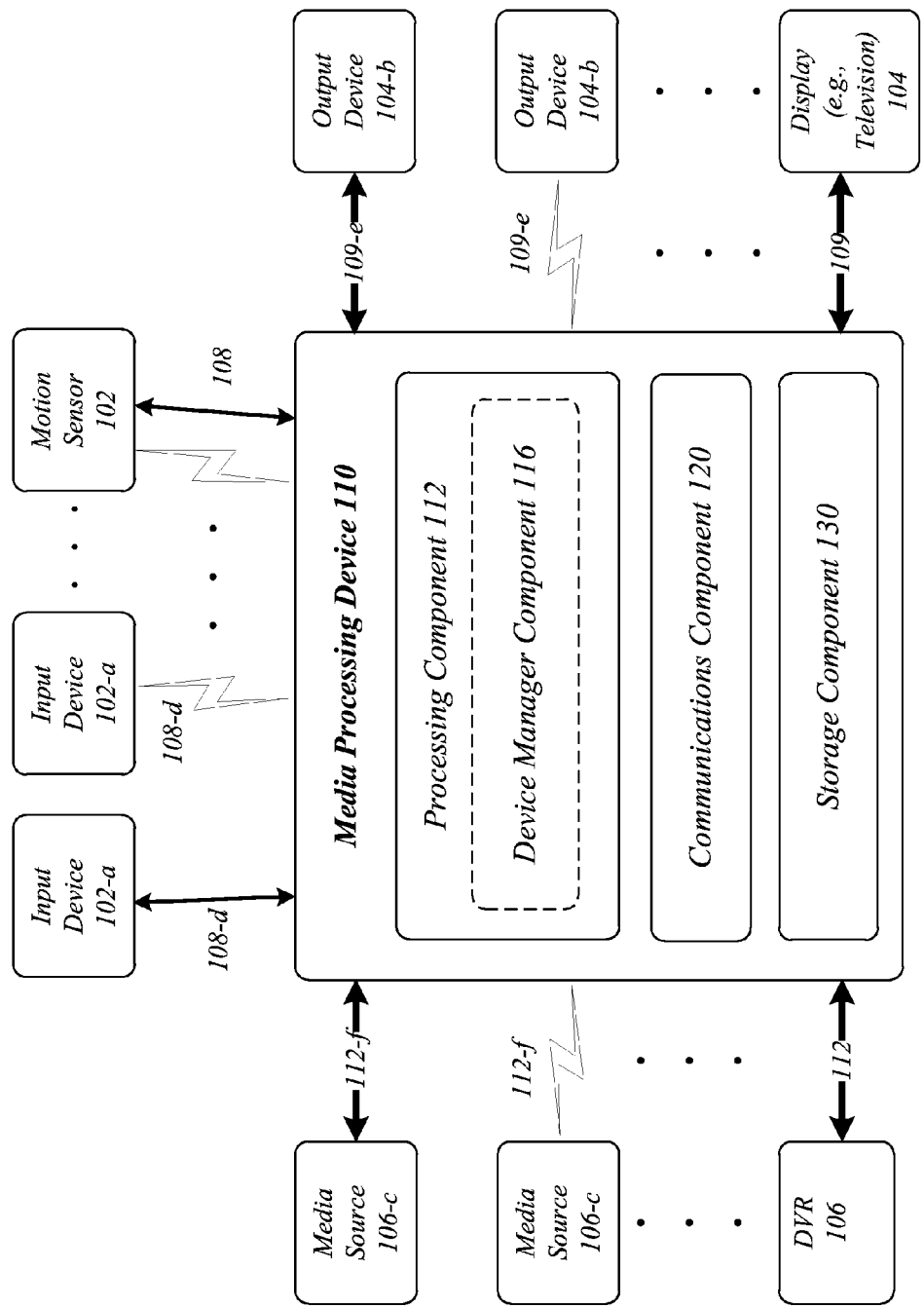
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in an functionally seamless and easily understood manner.

The digital home system may include, in various embodiments, a multi-axis integrated on-screen navigation component allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output devices may also be incorporated into the digital home system in various embodiments to further enhance the intuitive user interactions, ease of use and overall quality of the system. The embodiments are not limited in this context.

Various embodiments are directed to a motion sensor in communication with a media processing device and an output device such as a television display. The motion sensor may provide motion detection information to a processing component within a media processing device. The processing component may issue control directives capable of manipulating the television. For instance, based on the absence of motion in a viewing area associated with the television display, the processing component may issue a control directive to re-direct content to be recorded while also issuing a control directive to inactivate the television display to conserve energy. Upon receiving information that motion has been detected in the viewing area, the processing component may issue control directives to activate the television display and resume playing the content that was previously being watched. This may all be done without requiring an action on the part of a user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing system 100 may further comprise one or more input devices 102-a, one or more output devices 104-b, and one or more media sources 106-c. The media processing device 110 may be communicatively coupled to the input devices 102-a, the output devices 104-b, and the media sources 106-c via respective wireless or wired communications connections 108-d, 109-e and 112-f.

It is worthy to note that "a" and "b" and "c" and "d" and similar designators as used herein are intended to be variables representing any positive integer. Thus, for example, if an implementation sets a value for a=5, then a complete set of input devices 102-a may include computing devices 102-1, 102-2, 102-3, 102-4 and 102-5. The embodiments are not limited in this context.

In various embodiments, the media processing system 100 may include one or more input devices 102-a. In general, each input device 102-a may comprise any component or device capable of providing information to the media processing device 110. Examples of input devices 102-a may include without limitation remote control devices, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-b. An output device 104-b may comprise any electronic device capable of reproducing, rendering or presenting media content for consumption by a human being. Examples of output devices 104-b may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

In one embodiment, for example, the media processing system 100 may include a display 104. The display 104 may comprise any analog or digital display capable of presenting media information received from media sources 106-c. The display 104 may display the media information at a defined format resolution. In various embodiments, for example, the incoming video signals received from media sources 106-c may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640× 480), an extended graphics array (XGA) format resolution (1024×768), a super XGA (SXGA) format resolution (1280× 1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In one embodiment, the processing component 112 may optionally implement a device manager component 116. The device manager component 116 may receive signals indicative of the presence or absence of motion from a motion sensor 102. The device manager component 116 may forward the signals received from the motion sensor 102 to the processing component 112 as input for one or more applications under control of the processing component 112. The media processing device 110 may store content data in a storage component 130 comprised of memory.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication component 120 includes wired communications media and wireless communications media, as previously described.

Figure 2:
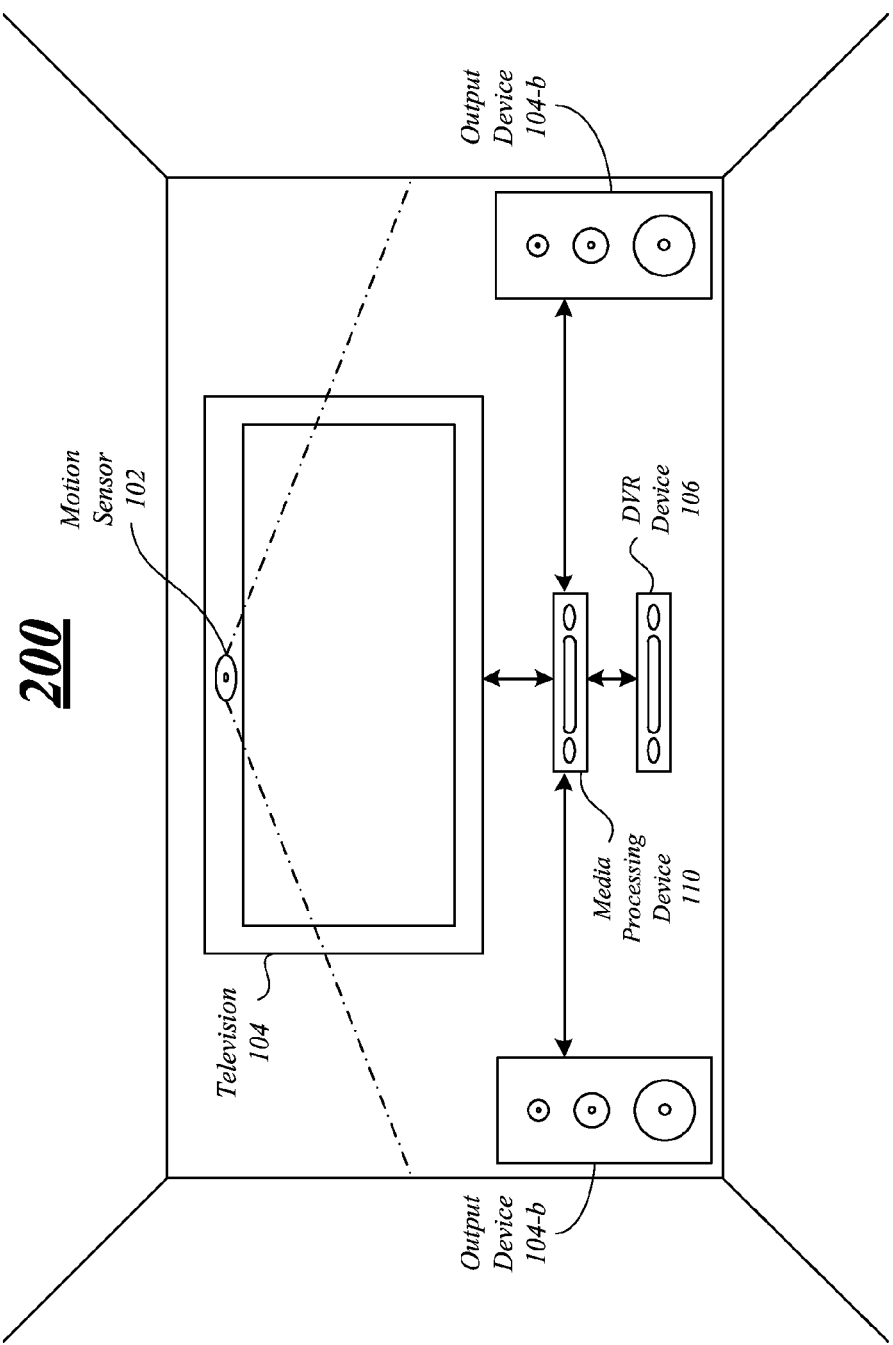
FIG. 2 illustrates one embodiment of a media processing system environment.

FIG. 2 illustrates a block diagram for a system 200 that may be the same or similar to media processing system 100 of FIG. 1 where like elements are similarly numbered. The system 200 may comprise a sample digital home system implementation that is arranged to provide media content from disparate media sources to viewers in a home, office, or room environment. Although the system 200 shown in FIG. 2 has a limited number of elements in a certain topology, it may be appreciated that the system 200 may include more or less elements in alternate topologies as desired for a given implementation. The embodiments are not limited in this context.

In the illustrated embodiment shown in FIG. 2, the system 200 may comprise a media processing device 110, a motion sensor 102, a television 104, speakers 104-b, and one or more media sources 106 (not shown). The motion sensor 102 may be integrated into and made a part of the television 104. The media processing device 110 may be communicatively coupled to the motion sensor 102, the television 104, speakers 104-b, and the media sources 106 via respective wireless or wired communications connections 108, 109, and 109-e. For purposes of illustration, the one or more media sources 106 of FIG. 2 (not shown) are part of, or integrated into, media processing device 110. Other embodiments are described and claimed.

Although FIG. 2 illustrates the motion sensor 102 as integrated with the television 104, it may be appreciated that the motion sensor 102 may be implemented with any of the devices shown in FIG. 2, including without limitation the media processing device 110, the DVR device 106, or the output devices 104-b. The embodiments are not limited in this context.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of television 104. Television 104 may comprise a digital television arranged to display information received from media processing device 110 over connection 109 in some embodiments. In various embodiments, output devices 104-b may comprise speakers arranged to reproduce audio or other acoustic signals received from media processing device 110. Other input device(s) 102-a may comprise a remote control, smart phone, or other suitable processing device capable of communicating with media processing device 110, television 104 or any other device in the digital home system 200. Together, each of the components, nodes or devices of system 200 may form or comprise one example embodiment of digital home entertainment system. The embodiments are not limited to the type, number or arrangement of components illustrated in FIG. 2.

Figure 3:
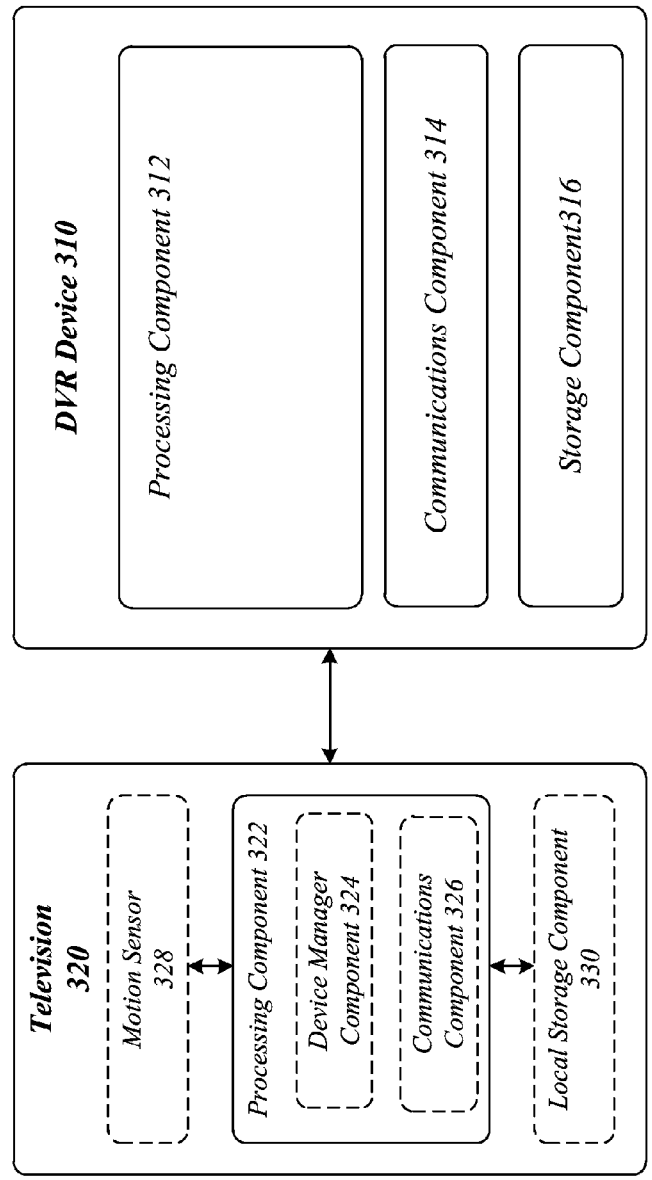
FIG. 3 illustrates one embodiment of a display processing system.

FIG. 3 illustrates one embodiment of a display processing system 300. The display processing system 300 may include a television 320 and a digital video recording device (DVR) 310. The television 320 may include an integrated motion sensor 328 operative to sense and detect the presence or absence of motion in a viewing area around the television 320. The television 320 may also include a processing component 322 that controls, inter alia, a device manager component 324 and a communications component 326.

The processing component 322 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In one embodiment, the device manager component 324 may receive signals indicative of the presence or absence of motion from the motion sensor 328. The device manager component 324 may forward the signals received from the motion sensor 102 to the processing component 322 as input for one or more applications under control of the processing component 322. The television 320 may include local storage 300 operative to store content data in memory.

The television 320 may execute communications operations or logic using the communications component 326. The communications component 326 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication component 326 may include wired communications media and wireless communications media, as previously described.

The DVR 310 may also include a processing component 312, a communications component 314, and a storage component 316. The processing component 312 and the communications component 314 may be comprised of similar elements and perform similar functions to those described with regard to television 320. The DVR storage component 316 is operative to store in memory data pertaining to one or more content streams. A content stream may be representative of video content, audio content, or audio/video content in one or more formats.

Figure 4:
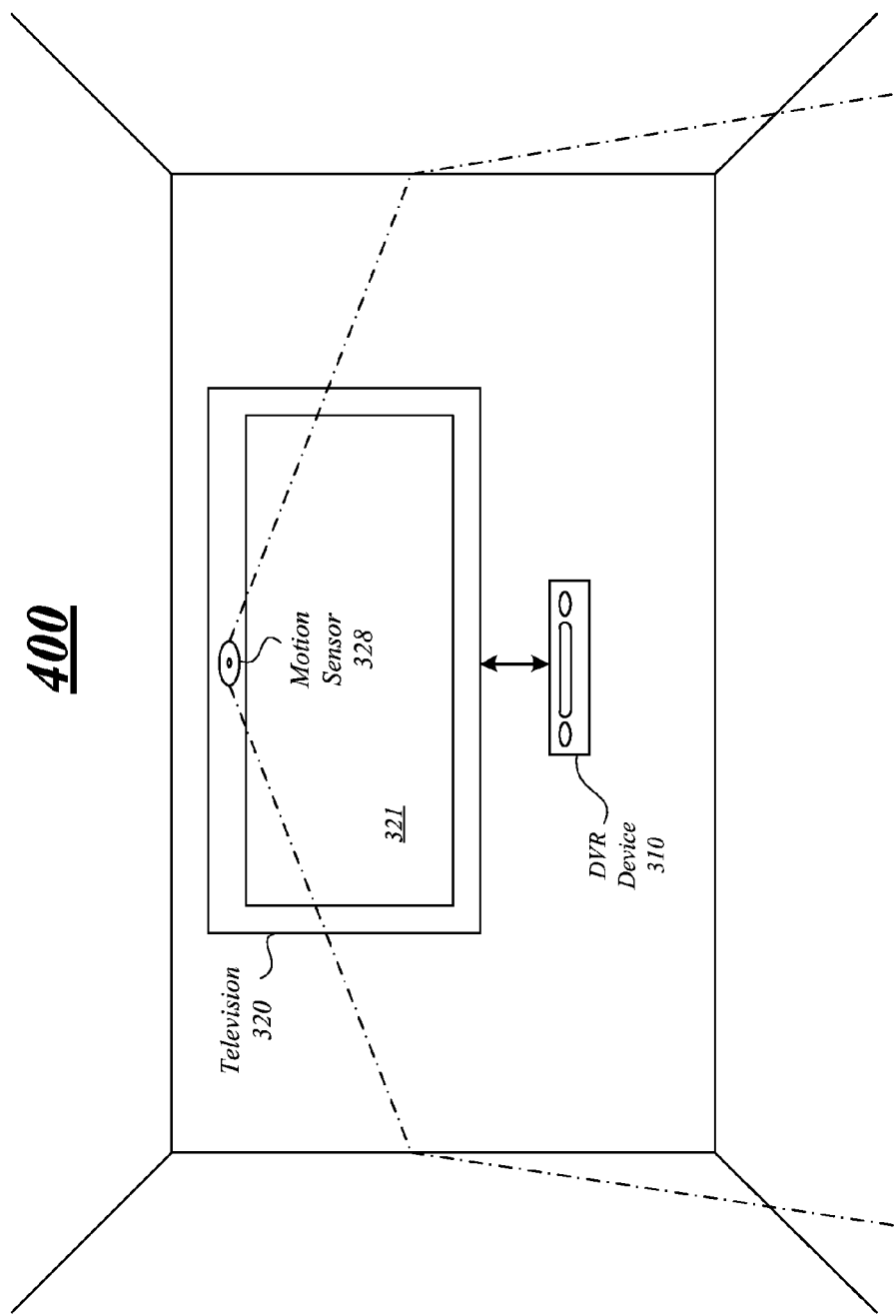
FIG. 4 illustrates one embodiment of a display processing system environment.

FIG. 4 illustrates a block diagram for a system 400 that may be the same or similar to display processing system 300 of FIG. 3 where like elements are similarly numbered. The system 400 may comprise the television 320 coupled with the DVR 310. The television 320 may include an integrated motion sensor 328. In operation, the motion sensor 328 monitors the viewing area for motion. Upon detecting an absence of motion for a specified period of time, motion sensor 328 sends a signal to the processing component 322 which is processed by the device manager component 324. The device manager component 324 may then determine that no one is in the viewing area based on the absence of motion detected. In such a case, the processing component 322 may redirect the content to be stored and inactivate the television display 321 into a sleep or powered down state. Inactivating the television display 321 conserves energy since the television display 321 is one of the largest consumers of power. Redirecting the content to be stored allows for a user to resume watching the content at a later date. The content may be stored locally within television 320 if there is a local storage component 330 provided. Alternatively, the television 320 via processing component 322 and communications component 324 may instruct the DVR 310 to store the content in its storage component 316. Upon detection of motion in the viewing area by motion sensor 328, the television display 321 may be activated out of its sleep or powered down state and the content that was previously playing may be resumed. All of the foregoing can be achieved without any intervention from a user.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
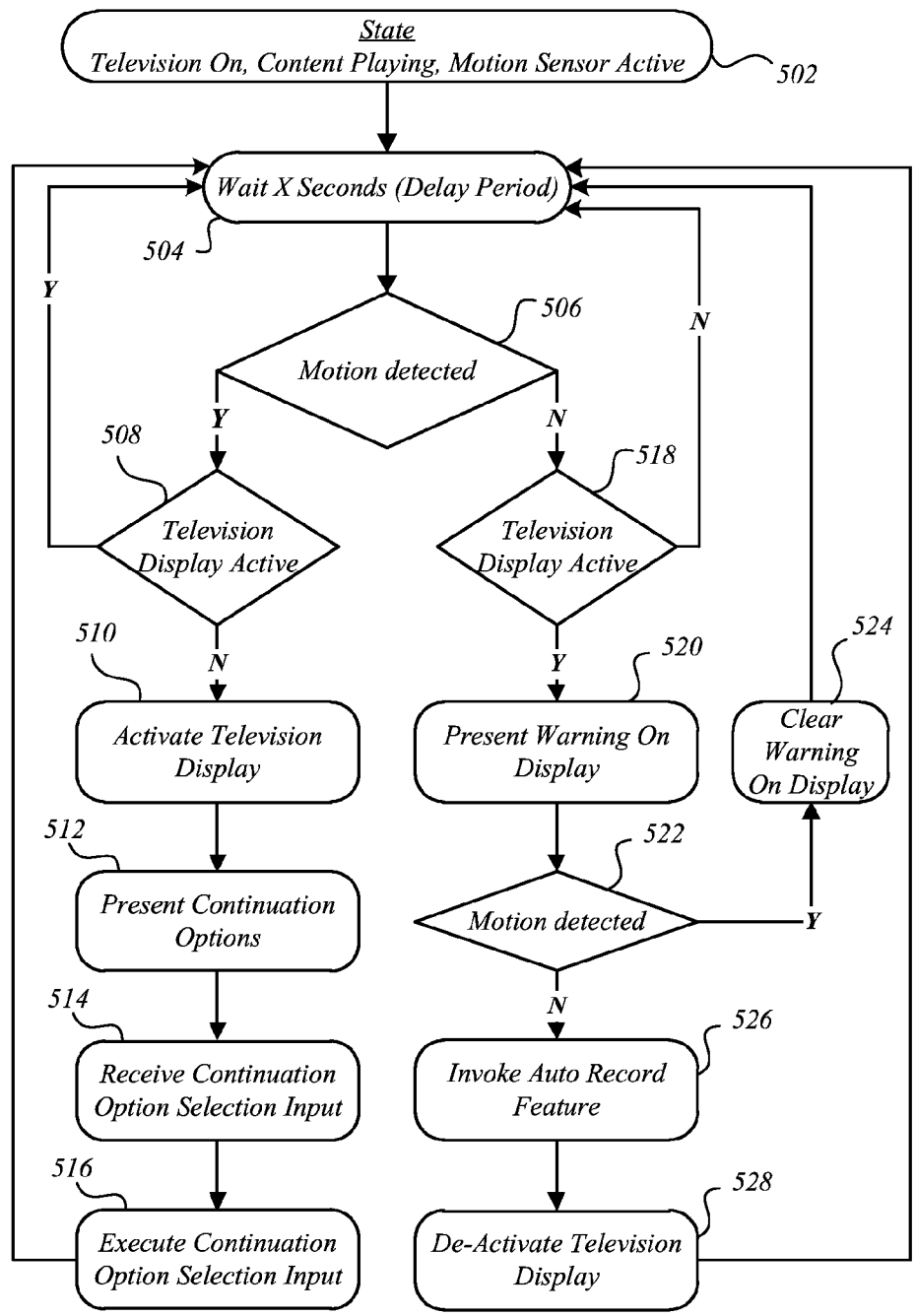
FIG. 5 illustrates one embodiment of a logic flow.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may be presented with a state for a display processing system 300 at block 502. For example, the television 320 may be on and the television display 321 active. Content may be playing on the television display 321 and the motion sensor 328 may be active. The embodiments are not limited in this context.

The logic flow 500 may wait for a period of time before performing any actions at block 504. For example, the wait period may be a user specified amount of time (e.g., 30 seconds) in which no processing may occur. During this period of time, the motion sensor 328 may be monitoring the viewing area to detect motion. Upon expiration of the wait period, the motion detector may send a signal to a device manager component 324 under control of the processing component 322. The embodiments are not limited in this context.

The logic flow 500 may determine whether any motion has been detected at block 506. For example, the device manager component 324 may process the signals sent by the motion sensor 328 to determine whether any motion has been detected in the viewing area since the last time the motion detector sent a signal to the device manager component 324. If the device manager component 324 determines that there has been motion detected based on the signal sent by the motion detector 328, the logic flow may take one path represented by blocks 508-516. If the device manager component 324 determines that there has not been motion detected based on the signal sent by the motion detector 328, the logic flow may take a different path represented by blocks 518-528. Each path will be described separately beginning with the path represented by blocks 508-516 followed by the path represented by blocks 518-528. The embodiments are not limited in this context.

If determined that motion was detected at block 506, the logic flow 500 may determine if the television display 321 is active at block 508. For example, there may be two states for the television display 321 upon detecting motion in block 506. These states may be active or inactive. If the television display 321 is determined to be active, the logic flow 500 may simply return to the wait period set out in block 504. An active television display 321 following a motion detected determination may mean that the motion detector has detected motion during the last wait period and that the system status should not be changed. If, however, the television display 321 is determined to be inactive, device manager component 324 may generate a control directive to activate the television display 321 at block 510. For example, an inactive television display 321 following a motion detected determination may mean that the motion detector has detected motion during the last wait period and that the system status should be changed.

The first change may be to activate the television display 321 because the motion sensor has detected motion indicating the presence of a user in the viewing area. The embodiments are not limited in this context.

The logic flow 500 may present continuation options at block 512. For example, the television display 321 may have just been activated indicating the presence of a user in the viewing area after a prolonged absence. The device manager component 324 may generate a control directive to present a user interface screen on the television display 321. The user interface screen may include one or more options for the user to resume viewing the television 320. The continuation options may include continuing the program that was interrupted when the television display 321 was put into the inactive state, presenting a guide menu of available content on available channels, presenting a menu of recorded content available for viewing, or providing an option to return the television display to an inactive state. The embodiments are not limited in this context.

The logic flow 500 may receive a signal indicative of a selection of one of the continuation options at block 514. For example, the user may interact with the user interface presenting the continuation options using a remote control device. The user may manipulate the remote control to select one of the aforementioned continuation options causing the device manager component 324 to receive a control signal indicative of the selected option. If no option is selected within a pre-defined time period (e.g., 15-60 seconds), a default selection that returns the television display 321 to an inactive state may be interpreted and executed. This may be a logical default selection if, for instance, a user passed through the viewing area with no intention of interacting with the television 320 but still triggering the motion sensor 328. The embodiments are not limited in this context.

The logic flow 500 may execute the selected continuation option at block 516. For example, the user may have selected to continue watching the content that was playing when the television display 321 went inactive due to a prolonged absence of motion in the viewing area. The device manager component 324 may generate a control directive to cause the content to resume playing by accessing it in memory (e.g., local storage component 330 or DVR storage component 316) and playing it back on the television display 321. The user may have selected to present a channel guide on the television display 321 to allow the user to select a different channel to watch. The user may have selected to present a menu of recorded content on the television display 321 to allow the user to select a different content to watch. Upon the device manager component 324 generating a control directive to execute a specific selection or a default selection, the logic flow 500 may return to the wait period of block 504 to resume the motion detection monitoring process. The embodiments are not limited in this context.

If determined that motion was not detected at block 506, the logic flow 500 may determine if the television display 321 is active at block 518. For example, there may be two states for the television display 321 upon detecting motion in block 506. These states may be active or inactive. If the television display 321 is determined to be inactive, the logic flow 500 may simply return to the wait period set out in block 504. If, however, the television display 321 is determined to be active, the device manager component 324 may generate a control directive to present a warning on the television display 321 at block 520. For example, an active television display 321 following a no motion detected determination may mean that the motion detector has not detected motion during the last wait period and that the system status should be changed. The embodiments are not limited in this context.

The logic flow 500 may determine if motion is detected by the motion sensor 328 after displaying the warning message at block 522. For example, the system may provide a user the opportunity to show that there is still a user in the viewing area but that the user is remaining somewhat still. If the motion sensor 328 does detect motion within a pre-defined period of time after displaying the warning message, the device manager component 324 may generate a control directive to clear the warning on the television display at block 524. The logic flow may then return to the wait period of block 504 to resume the motion detection monitoring process. The embodiments are not limited in this context.

If no motion is detected in block 522, the logic flow 500 may invoke an auto record feature at block 526. For example, if no motion is detected by motion sensor 328, the device manager component 324 may generate a control directive to cause the content being played to be recorded. The content may be recorded to local storage component 330 within television 320 or may be recorded to the storage component 316 associated with the DVR device 310. The embodiments are not limited in this context.

The logic flow 500 may then deactivate the television display 321 at block 528. For example, the device manager component 324 may generate a control directive to deactivate the television display 321 to conserve power because there has been no activity in the viewing area for a prolonged period of time. The logic flow may then return to the wait period of block 504 to resume the motion detection monitoring process. The embodiments are not limited in this context.

Figure 6:
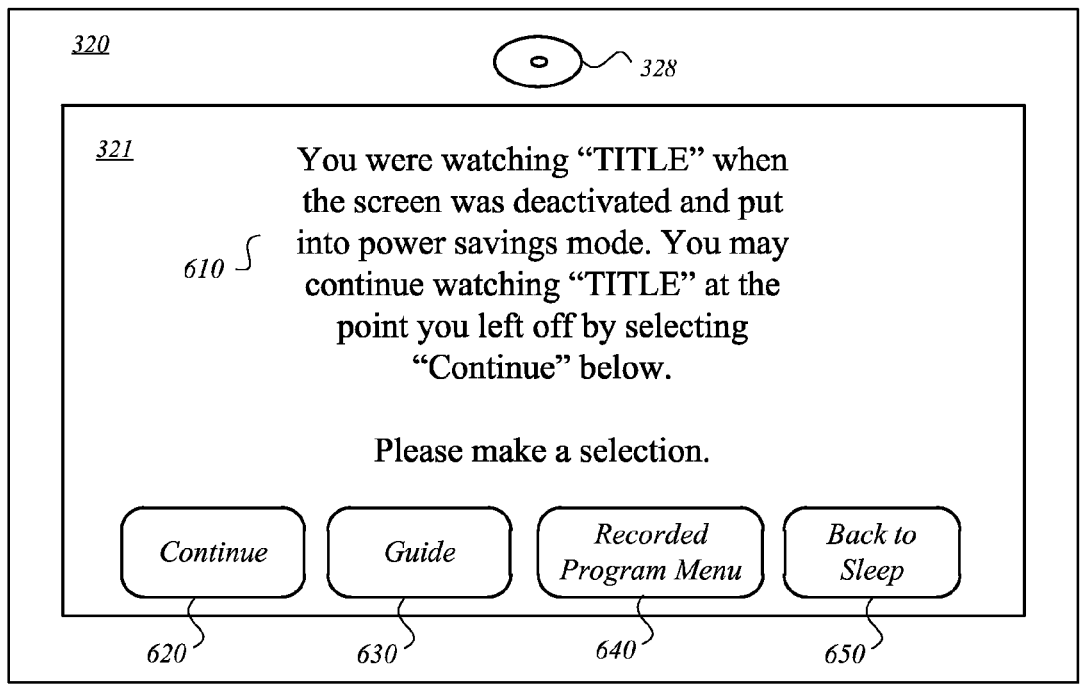
FIG. 6 illustrates one embodiment of a user interface display message.

FIG. 6 illustrates one embodiment 600 of a user interface display message. The television 320 may display a message to the user upon detecting motion in the viewing area after a prolonged absence of motion. The motion detection may cause the device manager component 324 to begin a process of waking up the television display 32. The first step may be to present the user with a user interface screen 610 that provides one or more options for resuming such as, for instance, continue 620, guide 630, recorded program menu 640, and back to sleep 650. If selected, the continue 620 option may permit watching the content that was playing when the television display 321 went inactive due to a prolonged absence of motion in the viewing area. If selected, the guide 630 option may present a channel guide on the television display 321 to allow the user to select a different channel to watch. If selected, the recorded program menu 640 option may present a menu of recorded content on the television display 321 to allow the user to select a different content to watch. If selected, the back to sleep 650 option may return the television to an inactive state. Other options may be implemented. The embodiments are not limited in this context.

Figure 7:
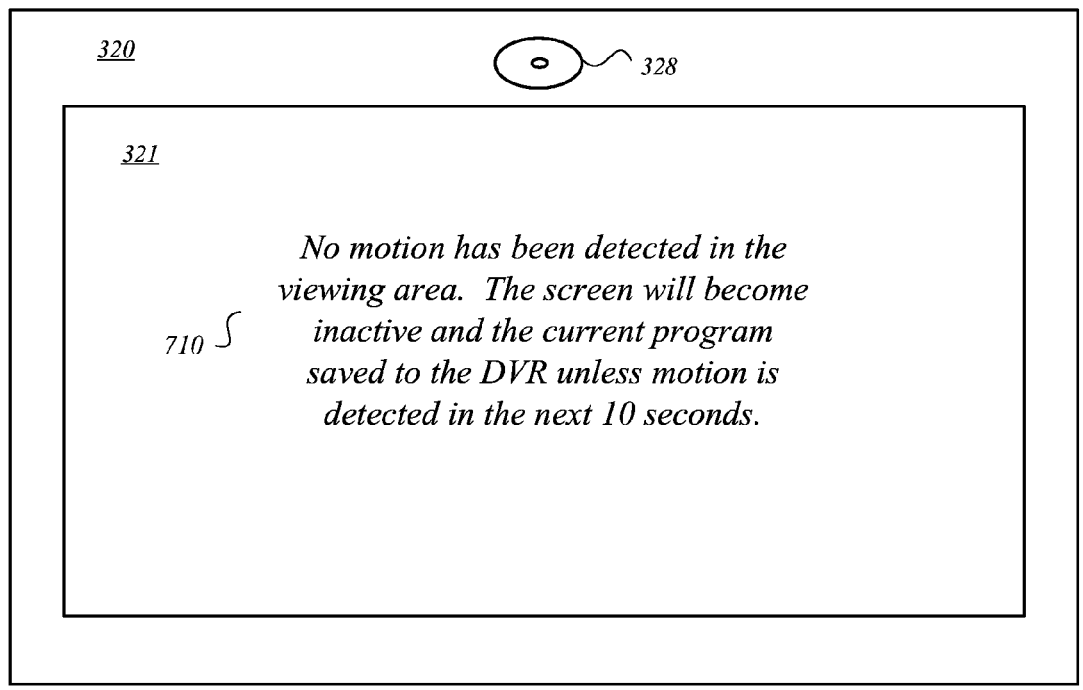
FIG. 7 illustrates one embodiment of a user interface display message.

FIG. 7 illustrates another embodiment 700 of a user interface display message. The television 320 may display a message 710 to the user upon detecting no motion in the viewing area after specified period of time. Prior to initiating any steps to inactivate the television display 321, the system may give a user the opportunity to demonstrate that the user is still in the viewing area. If the user can trigger the motion sensor 328 within a pre-defined period of time (e.g., 10 seconds), then any subsequent steps to inactivate the television display 321 can be avoided. The embodiments are not limited in this context.

Figure 8:
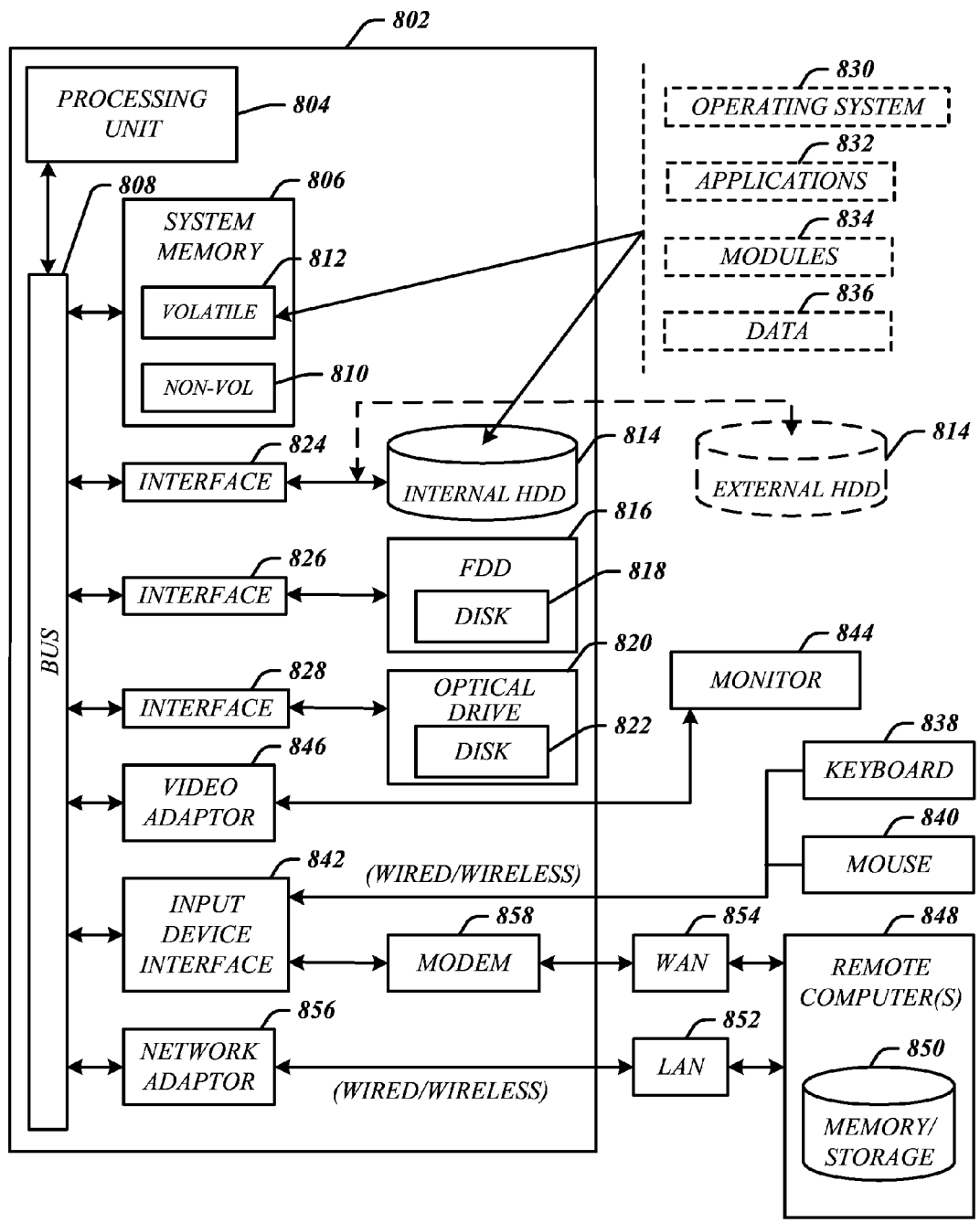
FIG. 8 illustrates one embodiment of a computing architecture.

FIG. 8 illustrates an embodiment of an exemplary computing architecture 800 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 800 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The computing architecture 800 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processing component; and
   a device manager component operative on the processing component to:
      receive signals from a motion sensor, the motion sensor disposed adjacent to a television display and configured to monitor a viewing area of the television display for motion;
      determine whether there is an absence of motion in the viewing area based on the signals;
      generate a first control directive to cause storage of video content to a recording device based on a determination that there is an absence of motion in the viewing area, where the determination is based on the signals from the motion sensor configured to monitor the viewing area of the television display; and
      generate a second control directive to inactivate a television display based on the determination that there is an absence of motion in the viewing area, where the determination is based on the signals from the motion sensor configured to monitor the viewing area of the television display.

2. The apparatus of claim 1, the device manager component operative to:
   determine whether this is a motion in the viewing area based on the signals;
   generate a third control directive to activate the television display upon a determination that there is a motion in the viewing area; and
   generate a fourth control directive to resume playing the video content stored in the recording device on the television display based on the determination that there is a motion in the viewing area.

3. The apparatus of claim 1, the device manager component operative to wait a period of time during which no motion is detected before generating the first and second control directives.

4. The apparatus of claim 1, the device manager component operative to
generate a fifth control directive to present a warning message on the television display, and
wait a period of time after displaying the warning message before generating the first and second control directives.

5. The apparatus of claim 4, the device manager component operative to generate a sixth control directive to clear the warning message on the television display when motion is detected within the period of time after presenting the warning message without generating the first and second control directives.

6. An apparatus, comprising:
an electronic display operative to present video content;
a local data storage component to store video content;
a motion sensor disposed adjacent to the electronic display, the motion sensor operative to monitor a viewing area of the electronic display for motion;
a processing component communicatively coupled with the motion sensor and the electronic display; and
a device manager component operative on the processing component to:
receive signals from the motion sensor, the signals indicative of the presence or absence of motion in the viewing area;
generate a first control directive to cause storage of video content to the local data storage component when there is an absence of motion in the viewing area based on the signals from the motion sensor indicative of the absence of motion in the viewing area of the electronic display; and
generate a second control directive to inactivate the electronic display when there is an absence of motion in the viewing area based on the signals from the motion sensor indicative of the absence of motion in the viewing area of the electronic display.

7. The apparatus of claim 6 wherein the processing component is further operative to:
generate a third control directive to activate the electronic display upon detection of motion in the viewing area; and
generate a fourth control directive to resume playing the video content stored in the recording device on the television display.

8. The apparatus of claim 7 wherein the processing component is further operative to:
generate a fifth control directive to present continuation options on the display;
receive a sixth control directive indicative of a selected continuation option; and
generate a seventh control directive to execute commands associated with the selected continuation option.

9. The apparatus of claim 8 wherein one of the continuation options includes an option to resume playing the content that was playing when the display was inactivated.

10. The apparatus of claim 8 wherein one of the continuation options includes an option to display a guide of content available to be displayed.

11. The apparatus of claim 8 wherein one of the continuation options includes an option to display a menu of recorded content available to be displayed.

12. The apparatus of claim 6 wherein the device manager component is operative to generate an eighth control directive to cause the storage of the video content to a remote data storage component when there is an absence of motion in the viewing area.

13. A method, comprising:
receiving signals from a motion sensor, the motion sensor disposed proximate to a television display and configured to monitor a viewing area of the television display for motion, the television display operative to display content, the signal to include an indication of a presence or an absence of motion in the viewing area;
determining whether there is an absence of motion in the viewing area based on the signals from the motion sensor configured to monitor the viewing area of the television display;
storing the remainder of the content to a recording device based on a determination that there is an absence of motion in the viewing area based on the signals from the motion sensor indicative of the absence of motion in the viewing area of the electronic display; and
inactivating the television display based on the determination that there is an absence of motion in the viewing area based on the signals from the motion sensor indicative of the absence of motion in the viewing area of the electronic display.

14. The method of claim 13 further comprising:
determining whether there is a presence of motion in the viewing area;
activating the television display based upon a determination that there is a presence of motion in the viewing area; and
resuming playing the content stored in the recording device on the television display based on the determination that there is a presence of motion in the viewing area.

15. The method of claim 13 further comprising:
waiting a period of time during which no motion is detected before storing the remainder of the content to the recording device and inactivating the television display.

16. The method of claim 13 further comprising:
displaying a warning message on the television display; and
waiting a period of time after displaying the warning message before storing the remainder of the content to the recording device and inactivating the television display.

17. The method of claim 16 further comprising:
clearing the warning message on the television display when motion is detected within the period time after displaying the warning message without storing the remainder of the content to a recording device and inactivating the television display.

18. A method, comprising:
periodically receiving from a motion sensor a first signal indicative of the presence or absence of motion in a viewing area of a television display, the motion sensor incorporated into the television display and configured to monitor the viewing area of the television display; and
when the first signal is indicative of the absence of motion:
storing content playing on a television display; and
de-activating the television display;
when the first signal is indicative of the presence of motion:
determining when the television display is inactive; and
activating the television display.

19. The method of claim 18 further comprising:
when the first signal is indicative of the absence of motion:
determining when a television display is active and displaying content;
presenting a warning message on the active television display;

receiving a second signal indicative of the presence or absence of motion; and clearing the warning message from the active television display when the second signal is indicative of the presence of motion.

20. The method of claim 18 further comprising:

when the first signal is indicative of the presence of motion:

presenting continuation options on the active television display;

receiving a control signal indicative of a selected continuation option; and executing commands associated with the selected continuation option.

21. The method of claim 18 further comprising:

waiting a user-definable period of time between receiving successive first signals indicative of the presence or absence of motion.

22. An article of manufacture comprising a non-transitory computer-readable storage medium containing instructions that when executed enable a system to:

receive a motion signal from a motion sensor disposed adjacent to an electronic display, the motion signal indicative of the presence or absence of motion in a viewing area of the electronic display, the motion sensor configured to monitor the viewing area, the electronic display operative to display content;

cause the storage of the content to a recording device when there is an absence of motion in the viewing area based on the signals from the motion sensor indicative of the absence of motion in the viewing area of the electronic display; and cause the electronic display to go inactive when there is an absence of motion in the viewing area based on the signals from the motion sensor indicative of the absence of motion in the viewing area of the electronic display.

23. The article of claim 22, further comprising instructions that when executed enable the system to:

cause the activation of the electronic display upon detection of motion in the viewing area; and cause the resumption of play of the content stored in the recording device on the electronic display.

24. The article of claim 22, further comprising instructions that when executed enable the system to:

wait a period of time during which no motion is detected before causing the storage of the content and causing the display to go inactive.

25. The article of claim 22, further comprising instructions that when executed enable the system to:

cause the display of a warning message on the television display; and wait a period of time after causing the display of the warning message before causing the storage of the content and causing the electronic display to go inactive.

26. The article of claim 25, further comprising instructions that when executed enable the system to:

cause the warning message on the electronic display to be cleared when motion is detected within the period time after causing the display of the warning message without causing the storage of the content and causing the electronic display to go inactive.

* * * * *